Patented July 4, 1950

2,513,488

UNITED STATES PATENT OFFICE 2,513,488

METHANOLYSIS OF POLYVINYL ESTERS

John Hall Hopkins, Woodstown, and Jesse Oris White, Arlington, N. J., assignors to E. I. du Pont de Nemours & Company, Wilmington, Del., a corporation of Delaware No Drawing. Application June 17, 1949,
Serial No. 99,866

9 Claims. (Cl. 260—91.3)

This invention relates to the methanolysis of polyvinyl esters and, more particularly, to the aqueous methanolysis of vinyl acetate to obtain polyvinyl alcohol which may contain up to a few per cent of residual acetate groups. This application is a continuation-in-part of applicants' copending application Serial No. 697,384, filed September 16, 1946 and now abandoned.

Heretofore, polyvinyl alcohol has been prepared by alcoholysis of polyvinyl esters, usually polyvinyl acetate as it is the most readily available ester. This alcoholysis reaction has been carried out in the presence of acid and alkali catalysts. While polyvinyl alcohol may be readily produced by these prior art procedures, the quality of the polyvinyl alcohol or, more specifically, the properties of the various compounds made from the polyvinyl alcohol, has varied considerably and the art has continued to look for improved procedures which will regularly give a polyvinyl alcohol of high quality.

An object of the present invention is to provide an improved process for the methanolysis of polyvinyl esters. A more specific object is to provide an improved process for the acid catalyzed methanolysis of polyvinyl acetate to obtain a polyvinyl alcohol adapted to be converted to a polyvinyl acetal of outstanding properties for use in safety glass interlayer sheeting. Other objects will be apparent from the description of the invention given hereinafter.

The above objects are accomplished according to the present invention by conducting the methanolysis of a polyvinyl ester at 50° C. to 80° C. in methanol containing an acid catalyst from the group consisting of mineral acids and sulfonic acids and, by weight of the methanol, one to six percent water. Preferably, the methanolysis is carried out at 60° C. to 70° C. in the presence of about two to three percent of sulfuric acid, by weight of the methanol, as the acid catalyst.

The following examples in which all parts are by weight unless otherwise stated, illustrate preferred specific embodiments of the invention.

Example I

Two jacketed kettles provided with agitators and temperature recorders and consisting of a dissolving kettle and a reaction kettle, are charged as follows:

1. Dissolving kettle:                       Parts
    Polyvinyl acetate _____ 100.0
    Methanol _____ 293.0
    Water _____   6.52
2. Reaction kettle:
    Methanol _____  82.6
    Water _____   1.74
    Concentrated sulfuric acid _____   8.26

The charge of the first kettle is dissolved and added over a period of approximately twenty minutes, with stirring, to the charge of the reaction kettle which is heated to 50° to 60° C. Since the time of addition and the rate of agitation act to regulate the size of the resulting particles of polyvinyl alcohol, they are controlled in accordance with the particle size desired. Upon completion of addition of the contents of the first kettle, the charge temperature is raised to 67°–68° C., and the reaction is continued for about six hours at the end of which time polyvinyl alcohol containing 3% residual vinyl acetate is obtained, the percentage being calculated by dividing the weight of vinyl acetate in the polymer by the weight of the polymer and multiplying by 100. The slurry of polyvinyl alcohol in reaction liquor thus obtained is cooled, centrifuged, and washed with methanol to yield a high grade polyvinyl alcohol that is especially suited as an intermediate in the manufacture of safety glass grade polyvinyl acetal. The conversion of this polyvinyl alcohol to polyvinyl acetal, as for instance polyvinyl butyral, may be accomplished by any of the methods known in the art.

Safety glass interlayer sheeting comprising polyvinyl butyral made from the polyvinyl alcohol of this invention is at least 15% tougher at 0° C., as measured by impact tests, than sheeting comprising polyvinyl butyral made from polyvinyl alcohol prepared by heretofore known conventional procedures.

Example II

Two jacketed kettles provided with agitators and temperature recorders and consisting of a dissolving kettle and a reaction kettle are charged as follows:

1. Dissolving kettle:                Parts
    Polyvinyl acetate _____ 100
    Methanol _____ 300
    Water _____ 16
2. Reaction kettle:
    Methanol _____ 83.3
    Water _____ 4
    p-toluene sulfonic acid _____ 17.8

The charge of the first kettle is dissolved and added over a period of approximately 40 minutes, with stirring, to the charge of the reaction kettle which is heated to 65° C. to 66° C. The reaction vessel is sealed and the heating and agitation are continued for a period of five hours until the precipitation of polyvinyl alcohol is complete, and thereafter for about one and a quarter hours more. The slurry of polyvinyl alcohol in the reaction liquor thus obtained is cooled, filtered, and washed with methanol to yield a high-grade polyvinyl alcohol that is especially suited as an intermediate in the manufacture of safety glass grade polyvinyl acetal.

It will be understood that the above examples are merely illustrative and that the invention relates to the methanolysis of polyvinyl esters generally in methanol containing an acid catalyst and, by weight of the methanol, one to six percent water, the reaction being carried out at a suitable temperature.

It has been found that polyvinyl alcohol of the highest quality is obtained by observing the limitations of the present invention and that the improvement of the polyvinyl alcohol is particularly noticeable in the qualities of polyvinyl butyral resin prepared from such polyvinyl alcohol. However, the limitations which are discussed further below must be substantially observed in order to realize the benefits of this invention and this is markedly true with respect to the water content of the methanol in which the methanolysis is carried out.

The presence of water within certain limits during the methanolysis reaction is a highly important and critical factor in the present invention and these limits are expressed in terms of the amount of water, by weight, to the amount of methanol since it is this relationship which is critical. The presence of water during the methanolysis tends to give a polyvinyl alcohol of definitely improved quality and this improvement in quality is sharply reflected in the increased toughness of sheets of polyvinyl butyral resin made from such polyvinyl alcohol. However, the use of water in any proportion does not lead to a satisfactory result since, when less than one percent water is used, the improvement in the quality of the polyvinyl alcohol is not appreciable while, when more than six percent water is used, the rate of the methanolysis reaction is too slow to be practical and the physical character of the polyvinyl alcohol is undesirable.

It is preferred that the methanolysis be carried out at a temperature of 60° C. to 70° C. although a temperature range of 50° C. to 80° C. is permissible. Temperatures outside this broader range are not satisfactory for use in the present invention. At temperatures above 63° C., the reaction should be conducted under pressure to prevent volatilization of methanol and the methyl acetate formed during the reaction. This pressure is preferably of low order and in the majority of cases it will be more convenient to use a pressure of less than ten pounds per square inch.

The present invention relates to a methanolysis reaction carried out in the presence of an acid catalyst from the group consisting of mineral acids and sulfonic acids. The art is familiar with such catalyst and, although sulfuric acid is preferred, hydrochloric and various sulfonic acids such as benzene sulfonic acid, p-toluene sulfonic acid, naphthalene sulfonic acid, methane, ethane, and propane sulfonic acids as well as mixed alkane sulfonic acids commercially available and primarily composed of propane sulfonic acid with smaller variable amounts of lower and higher alkane sulfonic acids, may be mentioned as others entirely suitable for use in the invention. The concentration of the acid catalyst may be varied considerably as those skilled in the art will appreciate but it has been found with sulfuric acid specifically and mineral acid catalysts generally that a proportion of two to three percent, by weight of the total methanol used, is preferable while a proportion of three to five percent is somewhat more favorable in the case of the sulfonic acids.

The proportion of water to methanol is highly critical and the proportion of acid catalyst to methanol is important to the extent it should at least be in the range of the catalytic proportions generally used in the acid catalyzed alcoholysis of polyvinyl esters but the proportion of methanol to polyvinyl ester being reacted, which determines the relation of both water and catalyst to polyvinyl ester as well, may be varied so widely it can hardly be regarded as an especially critical factor. Nevertheless, for each part of polyvinyl acetate or other ester used, the total methanol, by weight, should be between 2.33 parts and 9.0 parts; that is, a 30% to 10% solution of polyvinyl acetate in methanol should be used.

The present invention relates to the methanolysis of polyvinyl esters and contemplates within its scope a methanolysis reaction which is carried to substantial completeness. It is not the ordinary practice to convert polyvinyl acetate to absolute 100% polyvinyl alcohol as the difficulty in replacing the last few acetate radicals with hydroxyl radicals far outweighs any advantage to be derived therefrom. Even though the end product of the present invention is generally regarded as "polyvinyl alcohol" in the art, it may be polyvinyl alcohol containing anywhere from zero to five percent residual vinyl ester groups calculated as stated above.

Whereas a most advantageous utilization of polyvinyl alcohol prepared according to the present invention is as an intermediate in the manufacture of polyvinyl acetals, the polyvinyl alcohol of this invention is suitable for any polyvinyl alcohol use known to those in the art.

As many apparently widely different embodiments of this invention may be made without departing from the spirit and scope thereof, it is to be understood that the invention is not limited to the specific embodiments thereof except as defined in the appended claims.

The invention claimed is:

1. Process for the methanolysis of a polyvinyl ester which comprises conducting said methanolysis at 50° C. to 80° C., in methanol containing an acid catalyst from the group consisting of mineral acids and sulfonic acids, and, by weight of said methanol, one to six percent water.

2. Process as set forth in claim 1 wherein said polyvinyl ester is polyvinyl acetate.

3. Process as set forth in claim 2 wherein said methanolysis is conducted at 60° C. to 70° C.

4. Process as set forth in claim 2 wherein said methanolysis is conducted at 63° C. to 80° C. under a pressure not exceeding ten pounds per square inch.

5. Process for the methanolysis of a polyvinyl ester which comprises conducting said methanolysis at 50° C. to 80° C. in methanol containing a mineral acid catalyst and, by weight of said methanol, one to six percent water.

6. Process as set forth in claim 5 wherein said polyvinyl ester is polyvinyl acetate.

7. Process for the methanolysis of polyvinyl acetate which comprises conducting said methanolysis at 60° C. to 70° C. in methanol containing sulfuric acid as the catalyst for said methanolysis and, by weight of said methanol, one to six percent water.

8. Process for the methanolysis of polyvinyl acetate which comprises conducting said methanolysis at 60° C. to 70° C. in methanol containing, by weight of said methanol, two to three percent sulfuric acid and one to six percent water.

9. Process for the methanolysis of polyvinyl acetate which comprises conducting said methanolysis at 63° C. to 80° C. in methanol containing a mineral acid catalyst and, by weight of said methanol, one to six percent water, under a pressure not exceeding ten pounds per square inch.

JOHN HALL HOPKINS.
JESSE ORIS WHITE.

REFERENCES CITED

The following references are of record in the file of this patent:

UNITED STATES PATENTS

| Number | Name | Date |
|---|---|---|
| 1,897,856 | Noller | Feb. 14, 1933 |
| 2,108,857 | Hopff et al. | Feb. 22, 1938 |
| 2,109,883 | Herrmann et al. | Mar. 1, 1938 |
| 2,227,997 | Berg | Jan. 7, 1941 |

FOREIGN PATENTS

| Number | Country | Date |
|---|---|---|
| 563,991 | Great Britain | Sept. 7, 1944 |